United States Patent
Lee et al.

(10) Patent No.: US 8,306,114 B2
(45) Date of Patent: Nov. 6, 2012

(54) METHOD AND APPARATUS FOR DETERMINING CODING FOR COEFFICIENTS OF RESIDUAL BLOCK, ENCODER AND DECODER

(75) Inventors: Tammy Lee, Seoul (KR); Woo-jin Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1287 days.

(21) Appl. No.: 11/957,731

(22) Filed: Dec. 17, 2007

(65) Prior Publication Data

US 2008/0159389 A1   Jul. 3, 2008

(30) Foreign Application Priority Data

Jan. 3, 2007   (KR) ........................ 10-2007-0000707

(51) Int. Cl.
*H04N 7/12* (2006.01)
*H04N 11/02* (2006.01)
*H04N 11/04* (2006.01)

(52) U.S. Cl. .................................. 375/240.12
(58) Field of Classification Search .............. 375/240.12
See application file for complete search history.

(56) References Cited

U.S. PATENT DOCUMENTS

| | | | |
|---|---|---|---|
| 6,067,322 A * | 5/2000 | Wang | 375/240.17 |
| 6,263,021 B1 | 7/2001 | Sethuraman et al. | |
| 6,501,798 B1 | 12/2002 | Sivan | |
| 2003/0138150 A1 * | 7/2003 | Srinivasan | 382/238 |
| 2004/0181398 A1 * | 9/2004 | Sung et al. | 704/219 |
| 2005/0013365 A1 * | 1/2005 | Mukerjee et al. | 375/240.16 |
| 2006/0104527 A1 * | 5/2006 | Koto et al. | 382/239 |

FOREIGN PATENT DOCUMENTS

| | | |
|---|---|---|
| KR | 10-2004-0068257 A | 7/2004 |
| KR | 10-2004-0068963 A | 8/2004 |

* cited by examiner

*Primary Examiner* — Anh-Vu Ly
*Assistant Examiner* — Maharishi Khirodhar
(74) *Attorney, Agent, or Firm* — Sughrue Mion, PLLC

(57) ABSTRACT

Provided are a method and apparatus for determining coding for coefficients of a residual block, an encoder and a decoder. The method includes generating a residual block by subtracting a motion-compensated prediction block from the current block; frequency-converting coefficients of the residual block into frequency coefficients; frequency-converting coefficients of the motion-compensated prediction block into frequency coefficients; and determining coding for each of the coefficients of the frequency-converted residual block based on the coefficients of the frequency-converted prediction block. Accordingly, the amount of information transferred to a decoder can be reduced by not coding some coefficients of the residual block.

28 Claims, 4 Drawing Sheets

METHOD AND APPARATUS FOR DETERMINING CODING FOR COEFFICIENTS OF RESIDUAL BLOCK, ENCODER AND DECODER

CROSS-REFERENCE TO RELATED PATENT APPLICATION

This application claims priority from Korean Patent Application No. 10-2007-0000707, filed on Jan. 3, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to video coding, and more particularly, to determining coding for coefficients of a residual block, an encoder and a decoder.

2. Description of the Related Art

The main objective in compressing video data is to reduce the number of bits required for showing sequences of video images while maintaining an acceptable level of image quality when an encoded bitstream is reproduced. In particular, in video data compression, if video data in one frame is converted to the frequency domain, much energy is focused on a low-frequency signal. Accordingly, data is focused on a low-frequency component by dividing one frame into a plurality of macroblocks and performing 4×4 or 8×8 discrete cosine transformation (DCT) on each of the macroblocks, thereby greatly increasing compression efficiency.

DCT is a method of frequency conversion and is used to reduce spatial redundancy of pixels. DCT is widely used due to its superior performance compared to other conversion methods with respect to energy density. In video coding, 4×4 DCT and 8×8 DCT are used. A DCT converted image is decoded by performing inverse discrete cosine transformation IDCT.

When DCT is performed, DCT coefficients of a 4×4 block or DCT coefficients of an 8×8 block are obtained. The top left coefficient of the 4×4 block or the 8×8 block is a direct current (DC) coefficient and the others are alternating current (AC) coefficients. In particular, the DC coefficient is an average value of the DCT coefficients and a general shape of the block can be predicted by using the DC coefficient. When the AC coefficients of the prediction block have non-zero values at a predetermined frequency, the effect of a residual block at a corresponding frequency can be ignored.

Currently, a skip macroblock mode is used as a method of reducing the number of bits. The skip macroblock mode reduces the number of bits to be transferred to a decoder by not coding part of a macroblock. However, the conventional skip macroblock mode does not transfer all information regarding a residual block of the corresponding macroblock to the decoder. Also, a method of skipping some coefficients of the residual block is not disclosed.

SUMMARY OF THE INVENTION

The present invention provides a method and apparatus for determining coding for coefficients of a residual block, an encoder and a decoder, based on the finding that, when AC coefficients of a prediction block have non-zero values at a predetermined frequency, coefficients of a residual block at a corresponding frequency can be ignored.

According to an aspect of the present invention, there is provided a method of determining coding for coefficients of a current block, the method including (a) generating a residual block by subtracting a motion-compensated prediction block from the current block; (b) frequency-converting coefficients of the residual block into frequency coefficients; (c) frequency-converting coefficients of the motion-compensated prediction block into frequency coefficients; and (d) determining coding for each of the coefficients of the frequency-converted residual block based on the coefficients of the frequency-converted prediction block.

Operation (d) may further include converting AC coefficients of the frequency-converted residual block that have non-zero values, corresponding to AC coefficients of the frequency-converted prediction block that have non-zero values, to 0.

Operation (d) may further include converting all of the AC coefficients of the frequency-converted residual block to 0.

Operation (d) may further include generating a coding determination map based on the coefficients of the frequency-converted prediction block in order to determine coding for each of the coefficients of the frequency-converted residual block.

The current block and the prediction block may include 16×16 pixels, 8×8 pixels or 4×4 pixels.

According to another aspect of the present invention, there is provided a computer readable recording medium having recorded thereon a computer program for executing the method of determining coding for coefficients of a current block.

According to another aspect of the present invention, there is provided an apparatus for determining coding for coefficients of a current block, the apparatus including an adder which generates a residual block by subtracting a motion-compensated prediction block from the current block; a first frequency converter which frequency-converts coefficients of the residual block into frequency coefficients; a second frequency converter which frequency-converts coefficients of the motion-compensated prediction block into frequency coefficients; and a coding determiner which determines coding for each of the coefficients of the frequency-converted residual block based on the coefficients of the frequency-converted prediction block.

According to another aspect of the present invention, there is provided a video encoder including a motion estimator which generates motion information from a current block and a reference block; a motion compensator which generates a motion-compensated prediction block by applying the motion information to the reference block; a coding determination device which generates a residual block by subtracting the motion-compensated prediction block from the current block, frequency-converts coefficients of the residual block and the motion-compensated prediction block into frequency coefficients, and generates a coding determination map based on the coefficients of the frequency-converted prediction block in order to determine coding for each of the coefficients of the frequency-converted residual block; a quantizer which quantizes the frequency coefficients of the frequency-converted residual block; and an entropy encoder which entropy-encodes the coefficients of the quantized residual block based on the coding determination map and also entropy-encodes the motion information.

According to another aspect of the present invention, there is provided a video decoder including an entropy decoder which entropy-decodes motion information and coefficients of a residual block from the received bitstream; an inverse quantizer which inverse-quantizes the coefficients of the decoded residual block; an inverse frequency converter which converts the coefficients of the inverse-quantized residual block into spatial coefficients; a motion compensator which generates a motion-compensated prediction block by applying the decoded motion information to a reference block; a frequency converter which frequency-converts the coefficients of the motion-compensated prediction block into frequency coefficients, and generates a coding determination map based on the coefficients of the motion-compensated prediction block in order to determine coding for the coefficients of the residual block; and an adder which generates a current block by adding the motion-compensated prediction block to the frequency-converted residual block, wherein the entropy decoder decodes the coefficients of the residual block based on the coding determination map.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the following description of the present invention, a detailed description of known functions and configurations incorporated herein will be omitted when it may make the subject matter of the present invention unclear.

Figure 1:
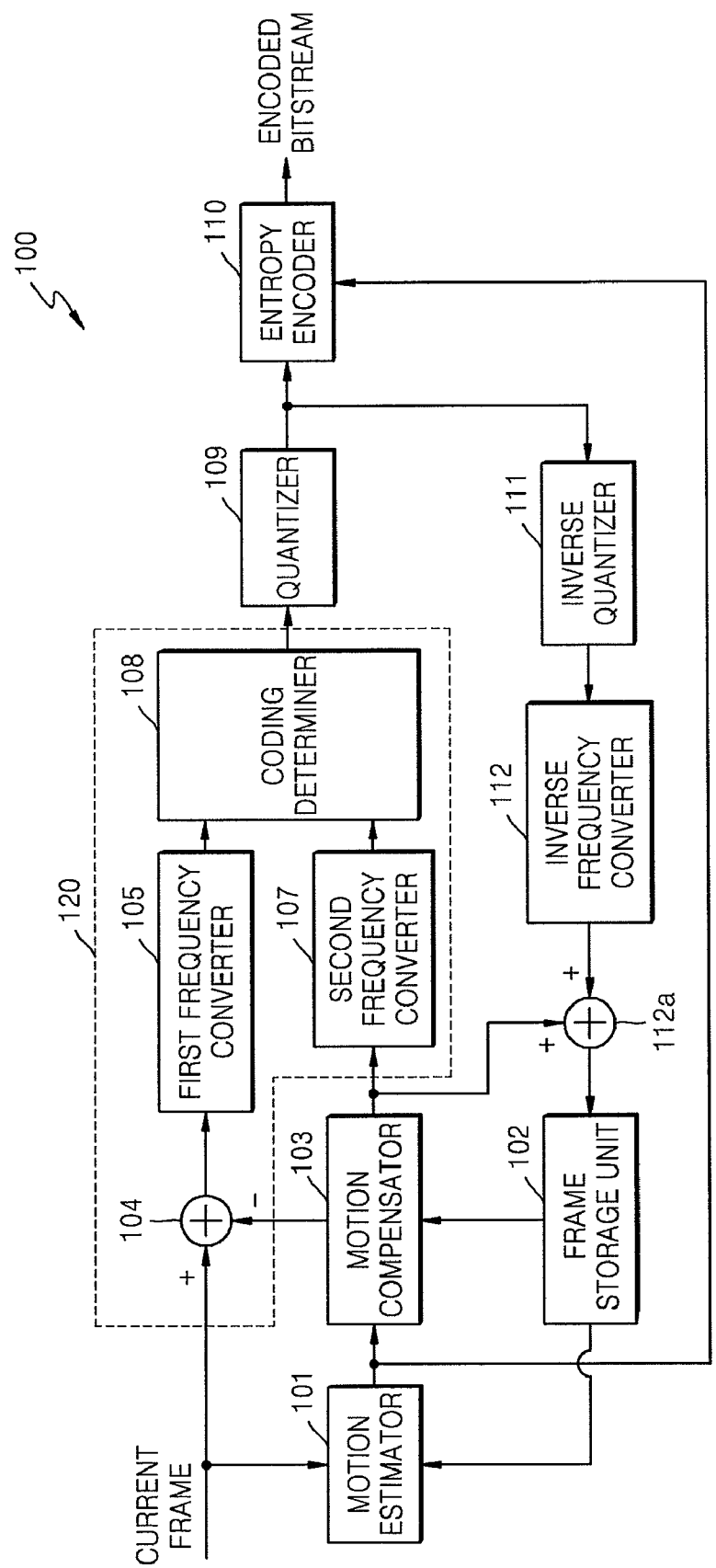
FIG. 1 is a block diagram of a structure of an encoder including a coding determination device according to an exemplary embodiment of the present invention.

FIG. 1 is a block diagram of a structure of an encoder 100 including a coding determination device 120 according to an exemplary embodiment of the present invention. The coding determination device 120 includes an adder 104, a first frequency converter 105, a second frequency converter 107 and a coding determiner 108.

Referring to FIG. 1, a motion estimator 101 searches a reference frame for a block that is the most similar to a block of a current frame by comparing the reference frame stored in a frame storage unit 102 and the current frame. In order to search the reference frame, the motion estimator 101 generates motion information and the motion information is transferred to a motion compensator 103 and an entropy encoder 110.

The frame storage unit 102 stores a reference block for motion estimation and compensation of a current block. The reference block may be a block of a temporally previous or following frame of the current frame.

The motion compensator 103 generates a motion-compensated prediction block by performing motion compensation on the reference block stored in the frame storage unit 102 by using the motion information generated by the motion estimator 101. The motion-compensated prediction block is also referred to as a predictor, and is a block of the reference frame, spatially corresponding to the current block. The prediction block is transferred to the adder 104, the second frequency converter 107 and an adder 112a.

The adder 104 generates a residual block by subtracting the motion-compensated prediction block from the current block. The residual block is transferred to the first frequency converter 105. Preferably, the current block and the prediction block are the same size and may be 16×16 pixels, 8×8 pixels or 4×4 pixels.

The first frequency converter 105 converts the spatial coefficients of the residual block received by the adder 104 into frequency coefficients by using DCT. The converted frequency coefficients of the residual block are transferred to the coding determiner 108.

Meanwhile, the second frequency converter 107 converts the spatial coefficients of the motion-compensated prediction block received from the motion compensator 103 into frequency coefficients. The conversion may be performed by using DCT as in the first frequency converter 105. The frequency coefficients of the frequency-converted prediction block are output to the coding determiner 108.

The coding determiner 108 generates a coding determination map based on the coefficients of the motion-compensated prediction block transferred from the second frequency converter 107. Preferably, the coding determiner 108 converts some or all of the DCT coefficients of the residual block to 0 based on the coefficients of the motion-compensated prediction block. The present invention is based on the fact that, when AC coefficients of the prediction block have non-zero values at a predetermined frequency, AC coefficients of the residual block at a corresponding frequency can be ignored.

Hereinafter, processes of converting coefficients will be described with reference to FIGS. 2 and 3.

Figure 2:
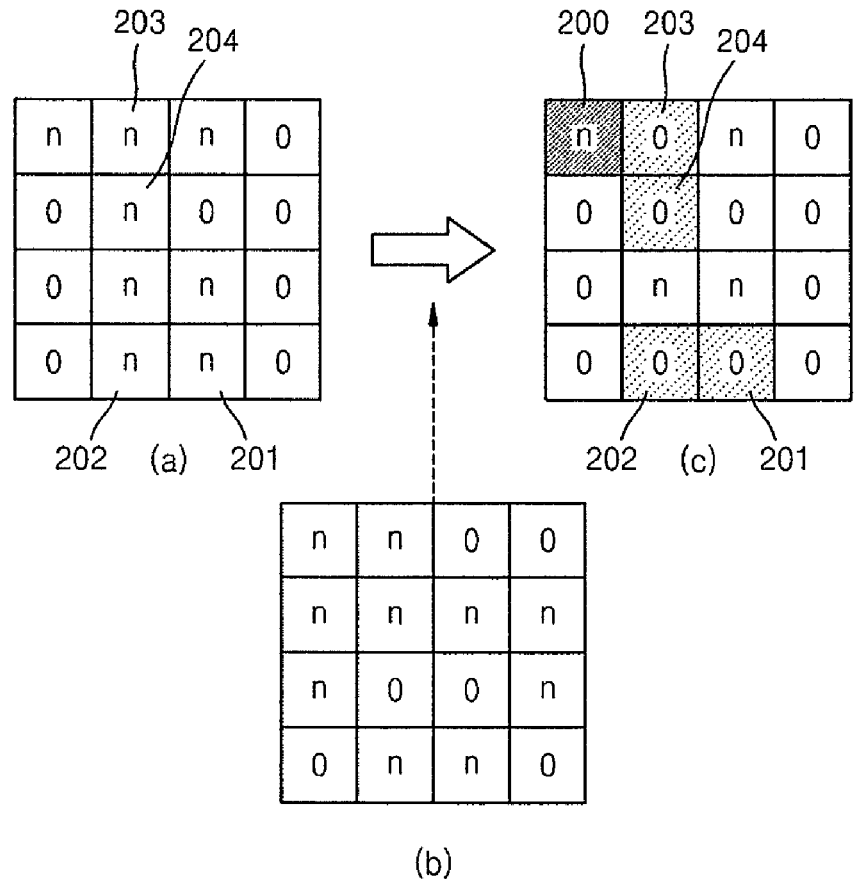
FIG. 2 is a conceptual view for describing processes of converting coefficients of a residual block according to an exemplary embodiment of the present invention.

FIG. 2 is a conceptual view for describing processes of converting coefficients of a residual block according to an exemplary embodiment of the present invention.

Referring to FIG. 2, (a) illustrates frequency coefficients of a residual block, (b) illustrates frequency coefficients of a motion-compensated prediction block, and (c) illustrates the frequency coefficients of the residual block after coefficient conversion is performed. As shown in (a) through (c), four frequency coefficients 201 through 204 of the residual block are converted to 0 when the corresponding frequency coefficients of both the prediction block and the residual block have non-zero values.

Figure 3:
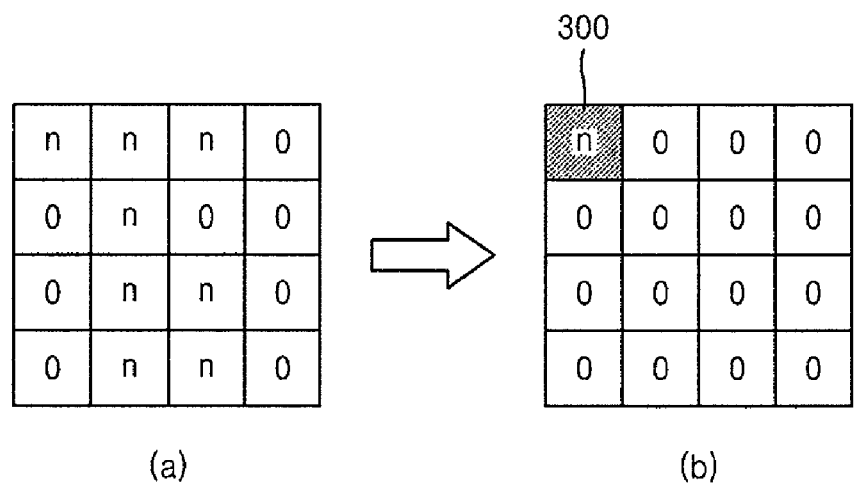
FIG. 3 is a conceptual view for describing processes of converting coefficients of a residual block according to another exemplary embodiment of the present invention.

FIG. 3 is a conceptual view for describing processes of converting coefficients of a residual block according to another exemplary embodiment of the present invention.

Referring to FIG. 3, (a) illustrates frequency coefficients of a residual block, and (b) illustrates the frequency coefficients of the residual block after coefficient conversion. In FIG. 3, all of the AC frequency coefficients of the residual block are converted to 0.

The coefficient conversion as illustrated in FIGS. 2 and 3 is limited to AC coefficients. Since DC coefficients 200 and 300 have important macroblock information, the DC coefficients are not converted to 0.

Hereinabove, only inter prediction is described, but the present invention can also be applied to intra prediction.

Referring back to FIG. 1, a quantizer 109 quantizes the coefficients of the residual block and the quantized coefficients are output to the entropy encoder 110.

The entropy encoder 110 entropy-encodes the residual block based on the coding determination map generated by the coding determiner 108 and generates an encoded bitstream.

Dataflow for generating the reference block will be described below.

An inverse quantizer 111 inverse-quantizes the residual block quantized by the quantizer 109 and the inverse-quantized residual block is output to an inverse frequency converter 112.

The inverse frequency converter 112 inverse-frequency converts the inverse-quantized residual block into a residual block including spatial coefficients. The inverse-frequency converted residual block is output to the adder 112a.

The adder 112a generates the reference block by adding the residual block output from the inverse frequency converter 112 and the motion-compensated prediction block received from the motion compensator 103. The generated reference block is output to the frame storage unit 102.

The frame storage unit 102 stores the reference block output from the adder 112a.

Figure 4:
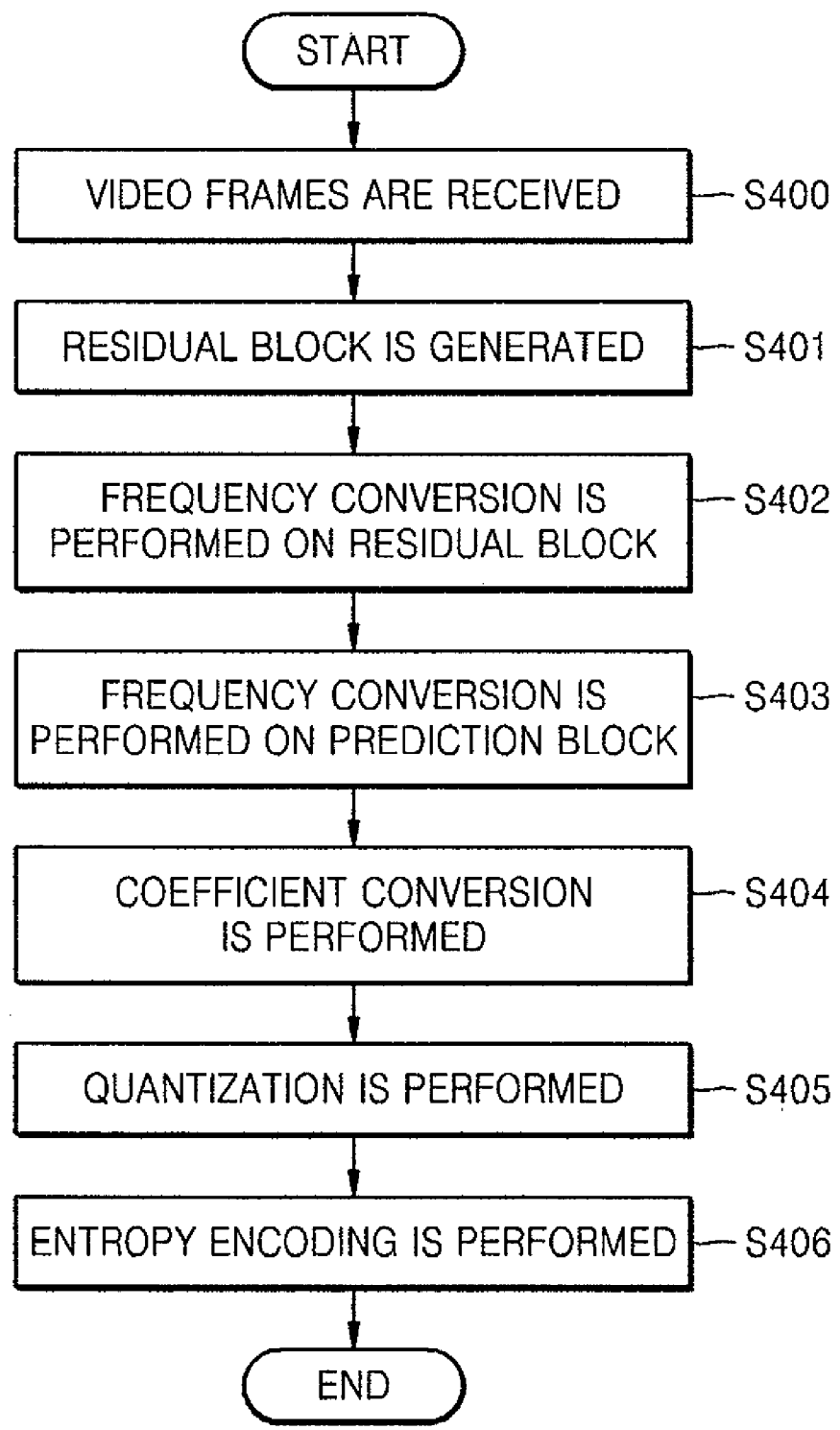
FIG. 4 is a flowchart of a method of encoding according to an exemplary embodiment of the present invention.

FIG. 4 is a flowchart of a method of encoding according to an exemplary embodiment of the present invention.

Referring to FIG. 4, in operation S400, video frames are received.

Then, in operation S401, a residual block is generated from the video frames. In more detail, motion information is generated, and then a motion-compensated prediction block using the motion information is generated. The residual block is generated by subtracting the motion-compensated prediction block from a current block.

In operation S402, spatial coefficients of the residual block are converted into frequency coefficients of the residual block.

In operation S403, spatial coefficients of the motion-compensated prediction block are converted into frequency coefficients.

In operation S404, some or all of the frequency coefficients of the residual block are converted to 0 based on the coefficients of the frequency-converted prediction block. For example, the frequency coefficients of the residual block, corresponding to AC frequency coefficients having non-zero values of the prediction block, may be converted to 0. Otherwise, all of the AC frequency coefficients of the residual block may be converted to 0. Then, a coding determination map is generated based on the coefficients of the motion-compensated prediction block.

In operation S405, the residual block including the converted coefficients is quantized.

Then, in operation S406, the coefficients of the quantized residual block are entropy-encoded and the motion information is also entropy-encoded, based on the coding determination map.

Figure 5:
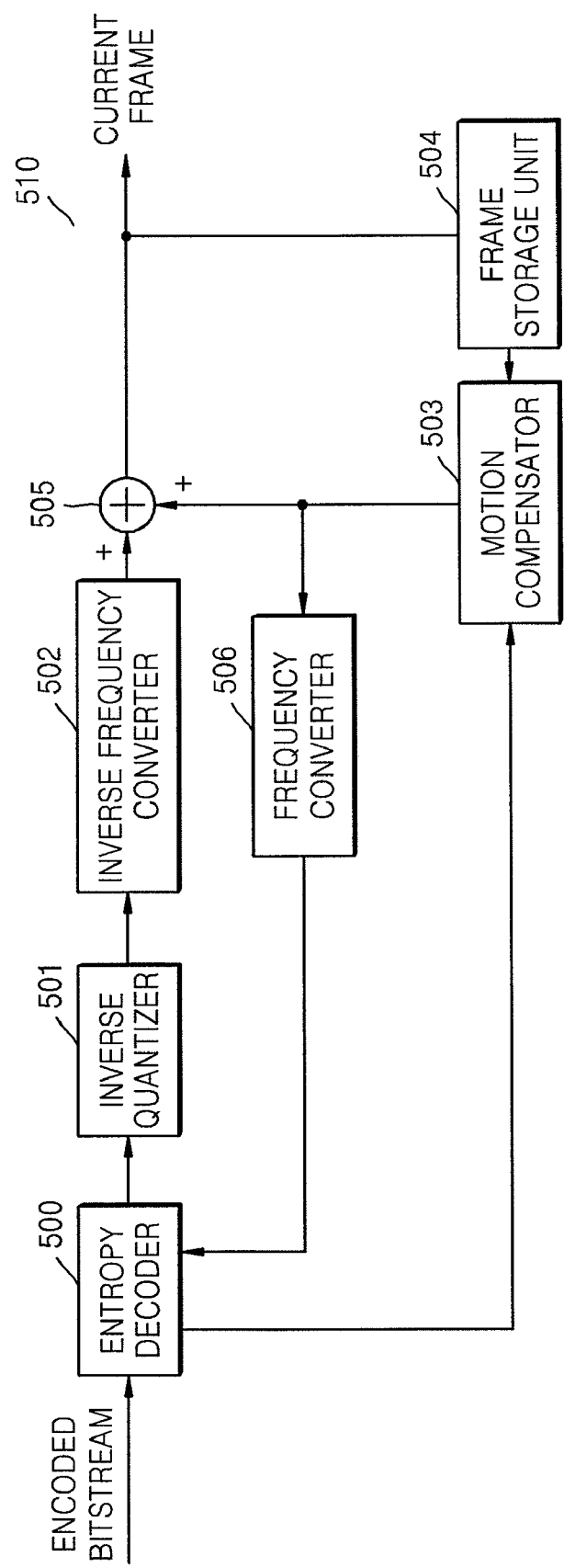
FIG. 5 is a block diagram of a structure of a decoder according to an exemplary embodiment of the present invention.

FIG. 5 is a block diagram of a structure of a decoder 510 according to an exemplary embodiment of the present invention. Referring to FIG. 5, the decoder 510 includes an entropy decoder 500, an inverse quantizer 501, an inverse frequency converter 502, a motion compensator 503, a frame storage unit 504, an adder 505 and a frequency converter 506.

The entropy decoder 500 receives an encoded bitstream and entropy-decodes motion information and coefficients of a residual block from the received bitstream. The decoded coefficients of the residual block are output to the inverse quantizer 501 and the decoded motion information is output to the motion compensator 503. When the residual block is decoded, the entropy decoder 500 decodes the residual block based on a coding determination map received from the frequency converter 506.

The inverse quantizer 501 inverse-quantizes frequency coefficients of the residual block received from the entropy decoder 500 and outputs the inverse-quantized frequency coefficients to the inverse frequency converter 502.

The inverse frequency converter 502 converts the inverse-quantized frequency coefficients into spatial coefficients and outputs the converted spatial coefficients to the adder 505.

The motion compensator 503 receives a reference block from the frame storage unit 504 and generates a motion-compensated prediction block by applying the motion information received from the entropy decoder 500 to the reference block. The motion-compensated prediction block is output to the adder 505 and the frequency converter 506.

The frame storage unit 504 stores the reference block output from the adder 505.

Meanwhile, the adder 505 generates restored data by adding the motion-compensated prediction block received from the motion compensator 503 to the residual block received from the inverse frequency converter 502.

The frequency converter 506 converts the spatial coefficients of the motion-compensated prediction block received from the motion compensator 503 into frequency coefficients. Meanwhile, the coding determination map is generated based on the coefficients of the motion-compensated prediction block. Then, the coding determination map is output to the entropy decoder and is afterwards used to decode the residual block.

As described above, based on the finding that, when AC coefficients of a prediction block have non-zero values at a predetermined frequency, coefficients of a residual block at a corresponding frequency can be ignored, the amount of information transferred to a decoder can be reduced by not coding some of the coefficients of the residual block.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of determining coding for coefficients of a current block, the method comprising:
    (a) generating a residual block by subtracting a motion-compensated prediction block from the current block;
    (b) frequency-converting coefficients of the residual block into frequency coefficients;
    (c) frequency-converting coefficients of the motion-compensated prediction block into frequency coefficients; and
    (d) determining by a computer coding for each of the frequency-converted coefficients of the residual block based on the frequency-converted coefficients of the prediction block.

2. The method of determining coding for the coefficients of the current block of claim 1, wherein the determining coding for each of the frequency-converted coefficients of the residual block further comprises converting AC (alternating current) coefficients of the frequency-converted coefficients of the residual block that have non-zero values, corresponding to AC coefficients of the frequency-converted coefficients of the prediction block that have non-zero values, to 0.

3. The method of determining coding for the coefficients of the current block of claim 1, wherein the determining coding for each of the frequency-converted coefficients of the residual block further comprises converting all AC coefficients of the frequency-converted coefficients of the residual block to 0.

4. The method of determining coding for the coefficients of the current block of claim 1, wherein the determining coding for each of the frequency-converted coefficients of the residual block further comprises generating a coding determination map based on the coefficients of the frequency-converted coefficients of the prediction block in order to determine coding for each of the coefficients of the frequency-converted coefficients of the residual block.

5. The method of determining coding for the coefficients of the current block of claim 1, wherein the current block and the prediction block comprise 16×16 pixels, 8×8 pixels or 4×4 pixels.

6. A non-transitory computer readable recording medium having recorded thereon a computer program for executing the method of claim 1.

7. An apparatus for determining coding for coefficients of a current block, the apparatus comprising:
    an adder which generates a residual block by subtracting a motion-compensated prediction block from the current block;
    a first frequency converter which frequency-converts coefficients of the residual block into frequency coefficients;
    a second frequency converter which frequency-converts coefficients of the motion-compensated prediction block into frequency coefficients; and
    a coding determiner which determines coding for each of the coefficients of the frequency-converted coefficients of the residual block based on the coefficients of the frequency-converted coefficients of the prediction block.

8. The apparatus of determining coding for the coefficients of the current block of claim 7, wherein the coding determiner converts AC coefficients of the frequency-converted coefficients of the residual block that have non-zero values, corresponding to AC coefficients of the frequency-converted coefficients of the prediction block that have non-zero values, to 0.

9. The apparatus of determining coding for the coefficients of the current block of claim 7, wherein the coding determiner converts all AC coefficients of the frequency-converted coefficients of the residual block to 0.

10. The apparatus of determining coding for the coefficients of the current block of claim 7, wherein the coding determiner generates a coding determination map based on the coefficients of the frequency-converted coefficients of the prediction block in order to determine coding for each of the coefficients of the frequency-converted coefficients of the residual block.

11. The apparatus of determining coding for the coefficients of the current block of claim 7, wherein the current block and the prediction block comprise 16×16 pixels, 8×8 pixels or 4×4 pixels.

12. A video encoder comprising:
    a motion estimator which generates motion information from a current block and a reference block;
    a motion compensator which generates a motion-compensated prediction block by applying the motion information to the reference block;
    a coding determination device which generates a residual block by subtracting the motion-compensated prediction block from the current block, frequency-converts coefficients of the residual block and coefficients of the motion-compensated prediction block into frequency coefficients, and generates a coding determination map based on the coefficients of the frequency-converted prediction block in order to determine coding for each of the coefficients of the frequency-converted residual block;
    a quantizer which quantizes the frequency coefficients of the frequency-converted coefficients of the residual block; and
    an entropy encoder which entropy-encodes coefficients of the quantized residual block based on the coding determination map and also entropy-encodes the motion information.

13. The video encoder of claim 12, wherein the coding determination device comprises:
    an adder which generates the residual block by subtracting the motion-compensated prediction block from the current block;
    a first frequency converter which frequency-converts the coefficients of the residual block into the frequency coefficients;
    a second frequency converter which frequency-converts the coefficients of the motion-compensated prediction block into the frequency coefficients; and
    a coding determiner which generates a coding determination map based on the frequency-converted coefficients of the prediction block in order to determine coding for each of the frequency-converted coefficients of the residual block.

14. The video encoder of claim 13, wherein the coding determiner converts AC coefficients having non-zero values of the frequency-converted coefficients of the residual block, corresponding to AC coefficients having non-zero values of the frequency-converted coefficients of the prediction block, to 0.

15. The video encoder of claim 13, wherein the coding determiner converts all AC coefficients of the frequency-converted coefficients of the residual block to 0.

16. The video encoder of claim 12, wherein the current block and the prediction block comprise 16×16 pixels, 8×8 pixels or 4×4 pixels.

17. A video decoder comprising:
- an entropy decoder which entropy-decodes motion information and coefficients of a residual block from a received bitstream;
- an inverse quantizer which inverse-quantizes the decoded coefficients of the residual block;
- an inverse frequency converter which converts the inverse-quantized coefficients of the decoded residual block into spatial coefficients;
- a motion compensator which generates a motion-compensated prediction block by applying the decoded motion information to a reference block;
- a frequency converter which frequency-converts coefficients of the motion-compensated prediction block into frequency coefficients, and generates a coding determination map based on the motion-compensated prediction block in order to determine coding for the coefficients of the residual block; and
- an adder which generates a current block by adding the coefficients of the motion-compensated prediction block to the frequency-converted coefficients of the inverse-quantized residual block,
- wherein the entropy decoder decodes the coefficients of the residual block based on the coding determination map.

18. The video decoder of claim 17, wherein at least one AC coefficient of the residual block is based on the frequency-converted coefficients of the motion-compensated prediction block.

19. The video decoder of claim 17, wherein the coding determiner converts all AC coefficients of the frequency-converted coefficients of the inverse-quantized residual block to 0.

20. The video decoder of claim 17, wherein the current block and the prediction block comprise 16×16 pixels, 8×8 pixels or 4×4 pixels.

21. The method of determining coding for the coefficients of the current block of claim 1, wherein the determining of the coding comprises determining coding of only alternating current (AC) coefficients of the residual block.

22. The method of determining coding for the coefficients of the current block of claim 21, wherein the determining of the coding comprises: converting only the AC coefficients of the frequency-converted coefficients of the residual block that have non-zero values, corresponding to AC coefficients of the frequency-converted coefficients of the prediction block that have non-zero values, to 0 and not converting DC coefficients of the residual block.

23. The method of determining coding for the coefficients of the current block of claim 1, wherein the determining is part of intra prediction process.

24. The video encoder of claim 12, wherein the coding determination device converts AC (alternating current) coefficients of the frequency-converted coefficients of the residual block that have non-zero values, corresponding to AC coefficients of the frequency-converted coefficients of the prediction block that have non-zero values, to 0.

25. The video encoder of claim 12, wherein the coding determination device converts all AC coefficients of the frequency-converted coefficients of the residual block to 0.

26. The video decoder of claim 17, wherein the coding determination map indicates that during encoding, each of the AC coefficients of the frequency-converted coefficients of the residual block are converted to 0.

27. The video decoder of claim 17, wherein during the decoding, the AC coefficients of the residual block converted to 0 are disregarded.

28. The method of determining coding for the coefficients of the current block of claim 1, wherein the determining coding for each of the frequency-converted coefficients of the residual block further comprises converting each AC (alternating current) coefficients of the frequency-converted coefficients of the residual block based on a value of a corresponding AC coefficient of the frequency-converted coefficients of the prediction block.

* * * * *